UNITED STATES PATENT OFFICE.

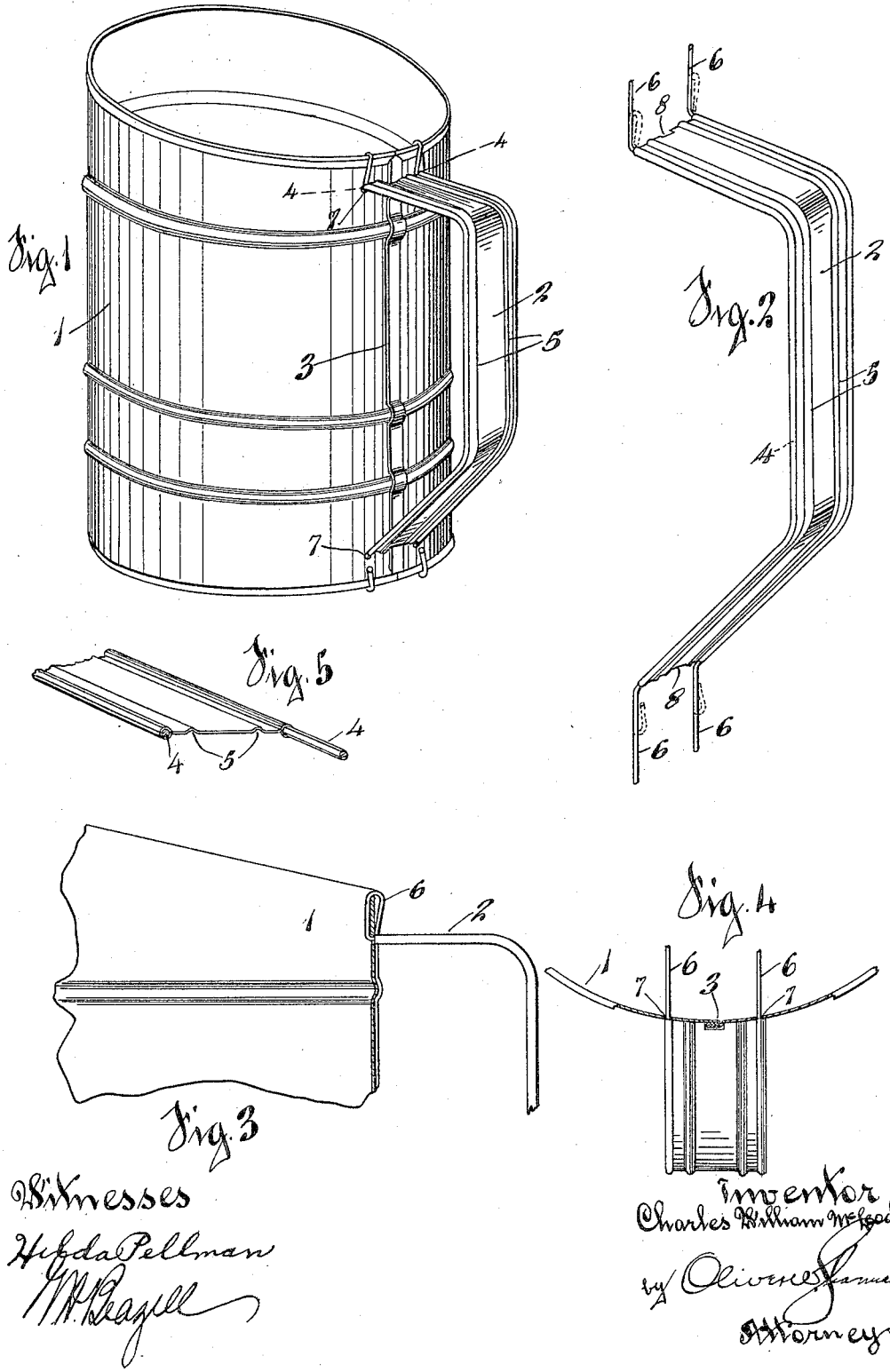

CHARLES WILLIAM McLEOD, OF WESTERVILLE, OHIO, ASSIGNOR TO THE BROMWELL BRUSH AND WIRE GOODS COMPANY, OF CINCINNATI, OHIO, A CORPORATION OF OHIO.

HANDLE FOR METAL RECEPTACLES.

1,179,856.

Specification of Letters Patent.   Patented Apr. 18, 1916.

Application filed July 27, 1914.   Serial No. 853,321.

*To all whom it may concern:*

Be it known that I, CHARLES WILLIAM McLEOD, a citizen of the United States, and a resident of Westerville, in the county of Franklin, in the State of Ohio, have invented certain new and useful Improvements in Handles for Metal Receptacles, of which the following is a clear, full, and exact description.

This invention relates to improvements in handles and more particularly to means for attaching handles to receptacles such as flour sifters and the like, or any article requiring a rigid handle.

In the particular class of goods referred to, it has been found difficult to provide a durable handle for same, due particularly to the difficulty in providing an efficient connection between the handle and body portion of the receptacle. A great many handles are fastened with solder which soon breaks and becomes loosened, rendering the entire device useless.

Other various means have also been found to gradually work loose with constant use, and it is the object of this invention to produce a handle for devices of this character which is not only unique in its design but is provided with simple and efficient means for attaching same to the body portion of the device without the use of solder, rivets, or bolts and nuts, etc.

The invention consists in producing a handle having preferably two wires parallel with each other and also preferably parallel with the edge of the handle, these wires extending beyond the handle at each end and adapted to pass through apertures in the wall of the receptacle or body portion of the device and bent and clamped thereto in a suitable manner to hold the handle securely to the body portion.

The invention consists further in certain parts and combination of parts as will be described in the following specification and pointed out in the appended claim.

In the accompanying sheet of drawings which serve to illustrate my invention and which shows a preferred construction: Figure 1 is a perspective view of a flour sifter equipped with my invention. Fig. 2 is an enlarged perspective view of the handle taken separately. Fig. 3 is a detail view of the construction of the top of the sifter showing wire connection of the handle. Fig. 4 is a cross sectional view taken approximately along the line 4—4 of Fig. 1. Fig. 5 is a fragment of the handle showing how the wires pass therealong parallel with each other and parallel with the edge of the handle.

Referring more particularly to the drawing 1 illustrates the body portion of a flour sifter or any other article of a like kind which may require a rigid handle. 2 represents the handle thereof and 3 the connecting seam of the metal walls of the receptacle.

The handle is provided with wires 4 along each edge thereof and is provided with the strengthening beads 5 parallel with its edges. While the handle is shown bent somewhat angularly it may be shaped in various ways to suit the taste of the manufacturer.

The wires 4 extend out beyond the ends of the handle forming extensions 6 which extensions are adapted to pass through the apertures 7 in the walls of the body portion 1. The extensions 6 are then bent around the top and bottom edges respectively of the receptacle and are pressed together clamping the body portion of the receptacle 1 therebetween and forming a secure fastening for the handle and holding it rigid with said body portion. The handle may be cut away as shown at 8 to allow same to fit around the connecting seam or bead 3 of the receptacle wall.

The handle being formed of substantially flat metal and being fastened at the sides at each end thereof to the receptacle, it is seen that when the wires are drawn taut that a very strong connection is obtained, and one which is not apt to become loosened with the ordinary usage to which these devices are put, owing to the fact that the ends of the handle are tightly held against the wall of the body portion bracing itself to a large degree against lateral strain.

Of course the ends of the handle are shaped to conform to the contour of the body portion, and when each side is clamped tightly to said body portion it is readily seen what a strong and durable handle is produced.

Certain modifications of my invention may be made without departing from its spirit and scope and I do not wish to be confined to the exact details shown.

What I claim as new and desire to secure by Letters Patent is:

In a flour sifter, comprising a cylindrical receptacle, a seam running vertically along said cylindrical receptacle, the handle abutting against the sides of said receptacle and against said vertical seam, said handle being notched at the top and bottom to receive and fit over said seam, wires running parallel with the edges of said handle, said wires adapted to pass through apertures in the sides of said receptacle and clamped over the top and bottom edges of said cylindrical receptacle, clamping the sides of said cylindrical receptacle, substantially as set forth.

CHARLES WILLIAM McLEOD.

Witnesses:
HANTZ R. JONES,
WILLIAM SANFIELD MACDONALD.